United States Patent
Kakadia et al.

(10) Patent No.: US 9,455,921 B2
(45) Date of Patent: Sep. 27, 2016

(54) END TO END NETWORK MANAGEMENT BASED ON QUALITY OF SERVICE ADJUSTMENTS

(71) Applicant: Verizon Patent and Licensing Inc., Basking Ridge, NJ (US)

(72) Inventors: Deepak Kakadia, Antioch, CA (US); Lalit R. Kotecha, San Ramon, CA (US); Priscilla Lau, Fremont, CA (US); Arda Aksu, Martinez, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 229 days.

(21) Appl. No.: 14/173,501

(22) Filed: Feb. 5, 2014

(65) Prior Publication Data

US 2015/0222549 A1   Aug. 6, 2015

(51) Int. Cl.
*H04L 12/801* (2013.01)
*H04L 12/24* (2006.01)
*H04L 12/26* (2006.01)
*H04L 12/851* (2013.01)
*H04L 12/857* (2013.01)
*H04L 12/841* (2013.01)
*H04L 12/835* (2013.01)

(52) U.S. Cl.
CPC ........... *H04L 47/18* (2013.01); *H04L 41/5019* (2013.01); *H04L 43/0823* (2013.01); *H04L 43/0852* (2013.01); *H04L 47/2483* (2013.01); *H04L 47/2491* (2013.01); *H04L 47/283* (2013.01); *H04L 47/30* (2013.01)

(58) Field of Classification Search
CPC ....................................................... H04L 47/24
See application file for complete search history.

(56) References Cited

U.S. PATENT DOCUMENTS

| | | | |
|---|---|---|---|
| 6,452,915 B1 * | 9/2002 | Jorgensen | H04L 1/20 370/328 |
| 6,940,814 B1 * | 9/2005 | Hoffman | H04L 12/5693 370/235 |
| 2002/0146023 A1 * | 10/2002 | Myers | H04L 47/10 370/412 |
| 2007/0280245 A1 * | 12/2007 | Rosberg | H04L 47/10 370/392 |
| 2012/0155298 A1 * | 6/2012 | Yang | H04W 24/08 370/252 |
| 2012/0236713 A1 * | 9/2012 | Kakadia | H04L 41/5025 370/230 |
| 2012/0307631 A1 * | 12/2012 | Yang | H04L 47/127 370/230 |
| 2013/0114408 A1 * | 5/2013 | Sastry | H04W 28/02 370/231 |

* cited by examiner

*Primary Examiner* — Dang Ton
*Assistant Examiner* — Nourali Mansoury

(57) ABSTRACT

A device may manage end-to-end traffic across a network based on adjusting Quality of Service (QoS) parameters. The device may receive performance requirements for packets corresponding to different applications and QoS levels within segments across the network, and measure performance values along the segments across the network. The device may also identify the application data flows and their associated network locations failing to meet performance values across network segments, and detect an application data flow failing to meet end-to-end (E2E) performance requirements. The device may determine network location(s) to adjust the QoS parameters of the detected application data flow, and adjust its QoS parameters at the determined network location(s) to bring the detected application data flow into compliance with its E2E performance requirements, while maintaining E2E performances compliance of other application data flows.

25 Claims, 10 Drawing Sheets

END TO END NETWORK MANAGEMENT BASED ON QUALITY OF SERVICE ADJUSTMENTS

BACKGROUND

Mobile wireless communication systems have finite resources which are typically shared among multiple users accessing different services. Such services may include, for example, video streaming and/or interactive messaging, e-mail, text messaging, web surfing, etc. Applications using different services can place varied demands on the wireless network. To address these demands, Quality of Service (QoS) techniques attempt to partition available network resources to provide an acceptable quality of experience for all of the users and their respective applications. Conventional QoS techniques rely on optimizing performance for individual network elements when scheduling packets for transmission. However, such techniques do not address improving and/or optimizing the end-to-end (E2E) application data flows across the entire network.

DETAILED DESCRIPTION OF THE PREFERRED EMBODIMENTS

Figure 1:
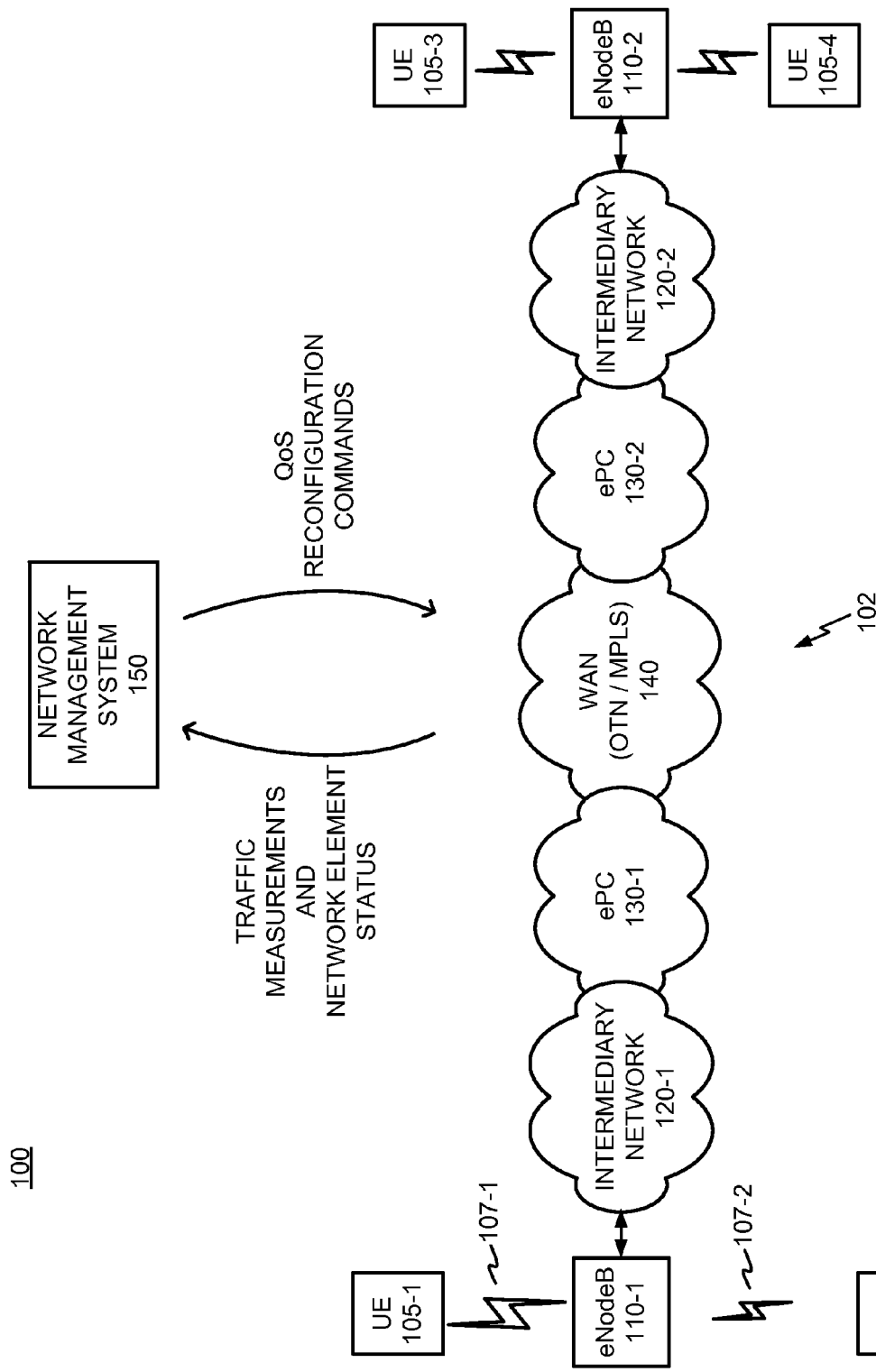
FIG. 1 is a block diagram illustrating an exemplary network environment which can be managed using quality of service adjustments.

The following detailed description refers to the accompanying drawings. The same reference numbers in different drawings may identify the same or similar elements. The following detailed description does not limit the invention.

Embodiments described herein are directed to approaches for providing end-to-end (E2E) network management based on adjusting Quality of Service (QoS) parameters. In an embodiment, one or more application data flows (ADFs) experiencing slow transfer rates in an affected section of the network can be compensated by increasing the ADF packets' transfer rates in another section of the network. As used herein, ADF packets experiencing slow transfer rates due to congestion may be referred to herein as experiencing "backpressure." In other words, the packets for an ADF may be "sped up" in another part of the network, which has sufficient networking resources to spare, in order to compensate for the backpressure in the affected section of the network. The aforementioned compensation permits an affected ADF to meet E2E performance requirements in order to make up for the slow transfer rates in the impacted section of the network. The slow transfer rates may be the result of bandwidth restrictions and/or high packet latencies due to traffic overloading and/or equipment issues within in any segment and/or network element throughout the network.

The aforementioned compensation may be accomplished by adjusting or "tuning" various QoS parameters for one or more network elements in the E2E path of the affected ADF. By properly selecting the network location(s), the types of QoS parameter(s), and/or the QoS parameter values, the QoS of the affected ADFs may be adjusted to shift network resources among different ADFs. Thus, an affected ADF may be granted additional network resources in any segment(s) of the E2E path, so that the affected ADF meets its E2E performance requirements, while other unaffected ADFs are allowed to retain sufficient network resources in order to maintain their E2E performance requirements. The change in QoS parameters may be temporary, and can revert back to their nominal values once the cause of the backpressure for the impacted section of the network is addressed. In various embodiments, optimization techniques may be used to properly allocate network resources and optimize QoS parameters of one or more network elements and/or their network locations. The optimization techniques may maximize improvements in E2E performance for affected ADFs while minimizing the E2E performance impacts to unaffected ADFs.

As used herein, a segment within a network (sometimes referred to herein as a "network segment") may be defined as path within the network between two or more network elements. One example of a segment within a Long Term Evolution (LTE) evolved Packet Core (ePC) is an S5/S8 connection between a packet data network (PDN) gateway (PGW) and a serving gateway (SGW). A network element may be defined as any device within the network which provides some network functionality, such as, for example, any type of gateway, router, switch, server, mobile device, base station, etc. A network location may be defined as an identifiable point within the network, which may be either in a segment or a network element. As used herein, end-to-end (E2E) may refer to any path which traverses the network between two endpoints which exchange packets, such as, for example, the communications path between two mobile devices during a voice call.

An application data flow (ADF) may be defined as a plurality of packets associated with a particular application type. Each application type may require different networking resources which can be characterized by a variety of QoS parameters indicating the relative priorities of the packets. These priorities can be based upon the resource requirements and latency sensitivities of the application associated with the ADF. Using the QoS parameters, ADFs may be divided into different service categories based on their relative priority. For example, buffered video streaming and email can be classified under the same QoS parameter, and thus receive the same level of service. Different QoS parameters may be used at different networking levels and/or locations within the network. For example, at the network layer (Layer 3), adjusting Differentiated Services Code Point (DSCP) markings may be used to control packet flow. In another example, at the data link layer (Layer 2), altering 802.pq priority markings may be used to adjust packet flow. Additionally, in the Radio Access Network (RAN), QoS Class Identifiers (QCIs) may be adjusted to control packet flow. Embodiments provided herein may select among the different QoS parameters, and/or their associated network locations, to determine how to have the greatest influence on improving the flow of the affected ADF while ensuring other ADFs maintain conformance with their E2E performance requirements. In other implementations, methodology described herein may be used to identify idle/unused capacity in a network which can be offered to customers in measured allotments at different rates.

FIG. 1 is a block diagram illustrating an exemplary network environment 100 which can be managed using QoS adjustments. In an embodiment, the network environment 100 may include User Equipment (UE) 105 (as used herein, collectively referred to as "UE 105" and individually as "UE 105-$x$"), evolved Node Bs (eNodeB) 110 (collectively referred to as "eNodeB 110" and individually as "eNodeB 110-$x$"), an infrastructure network 102, and a Network Management System (NMS) 150. Infrastructure network 102 may further include an intermediary network 120 (collectively referred to as "intermediary network 120" and individually as "intermediary network 120-$x$"), an evolved Packet Core (ePC) 130 (collectively referred to as "ePC 130" and individually as "ePC 130-$x$"), and a Wide Area Network 140. For ease of explanation, only a limited number of network elements are shown in network environment 100 depicted in FIG. 1. However, it should be understood that a greater number of network elements may be part of network environment 100, including other types of known network entities not illustrated in FIG. 1. Other embodiments may include additional or different network entities in alternative configurations than which are exemplified in FIG. 1. Additionally, embodiments described herein may be presented within the context of the Long Term Evolution (LTE) wireless standard for ease of explanation. However, aspects of the invention are not restricted to the LTE standard, and may be applied to other networking standards, such as, for example, LTE Advanced, Global System for Mobile Communications (GSM), Universal Mobile Telecommunications System (UMTS), IS-2000, etc.

UEs 105 may communicate with infrastructure network 102 through eNodeB 110 over a wireless channel 107 (collectively referred to as "wireless channel 107" and individually as "wireless channel 107-$x$"). Infrastructure network 102 may exchange ADFs between two or more UEs 105, and/or with one or more content servers (not shown), through one or more eNodeBs 110. Each eNodeB 110 may interface with the infrastructure network 102 through an intermediary network 120. While FIG. 1 only shows one eNodeB 110-1, 110-2 connected to each intermediary network 120-1, 120-2, respectively, an intermediary network 120-$x$ may be functionally coupled to a plurality of eNodeBs 110. According to an embodiment, one or more eNodeBs 110, which may be functionally interconnected to each other and can also be separately connected to intermediary network 120, may be referred to as the evolved UMTS Terrestrial Radio Access Network (eUTRAN). In other embodiments using different wireless standards, the eNodeBs may be referred to as base stations and the eUTRAN referred to simply as a Radio Access Network (RAN). The intermediary network 120 may interface to ePC 130 which handles the ADFs over user plane traffic (e.g., Access Stratum functionality), and perform control operations for eNodeBs 110 and UEs 105 based at least in part on control plane signals (e.g., Non-Access Stratum functionality). Each ePC 130 may interface with each other to exchange ADFs through a WAN 140. WAN 140 may include a plurality of networks which can span large areas, thus permitting UEs 105 to communicate over practically any geographical distance.

NMS 150 may be may communicate with network elements throughout the networking environment 100 to manage ADFs from one network endpoint to another, thus providing E2E networking management for any ADF. NMS 150 may receive traffic measurements and network element status from UEs 105, eNodeBs 110, and/or network elements within intermediate networks 120, ePCs 130, and/or WAN 140. Based upon the traffic measurements and/or the network element status received, NMS 150 may subsequently provide QoS reconfiguration commands to one or more network elements in the networking environment 100 manage and/or optimize E2E ADF performance. Accordingly, to ensure E2E performance compliance for any ADFs being exchanged across the network, QoS commands may be provided to UEs 105, eNodeBs 110, and/or network elements within intermediate networks 120, ePCs 130, and/or WAN 140. While NMS 150 could interact with all of the network elements within network environment 100, in some embodiments, NMS 150 may only interact with a subset of network elements in order to perform E2E network management.

The following description provides one example of how NMS 150 can manage resources among multiple users to ensure that each users' ADF complies with its respective E2E performance requirement. As will be seen below, NMS 150 can actively manage network resources to compensate ADFs traversing network segments experiencing backpressure. Further referring to FIG. 1, UE 105-1 may be exchanging ADFs with UE 105-3 during a voice call (hereinafter referred to as "ADFs1"), and UE 105-2 may be exchanging ADFs with UE 105-4 during a separate voice call (hereinafter referred to as "ADFs2"). Both ADFs1 and ADFs2 may be associated with a common voice communications application (such as, for example, the default application associated with a mobile network operators voice services), thus the ADFs start out with the same QoS priority parameters in eNodeBs 110 and infrastructure network 102. In performing E2E network management, NMS 150 may monitor traffic flows throughout the network, which include both ADFs1 and ADFs2, which NMS 150 may identify and separately track their E2E performance. In the example shown in FIG. 1, UE 105-1 in close proximity to eNodeB 110-1, and thus has a wireless channel 107-1 having strong signal conditions (e.g., high signal-to-noise ratio (SNR)). Thus, the application data flows ADFs1 traversing along the segment supported by wireless channel 107-1 will be afforded more than adequate bandwidth and efficient modulation coding (e.g., modulation coding schemes providing a high number of bits per symbol). In contrast, UE 105-2 may suffer from a wireless channel 107-2 having weaker signal conditions (e.g., low SNR), which may be due to its greater distance to eNodeB 110-1. Accordingly, the application data flows ADFs2 flowing across this segment supported by wireless channel 107-2 will have less bandwidth and will be encoded with modulation coding schemes which are less efficient (e.g., fewer bits per symbol). Accordingly, application data flows ADFs2 may experience backpressure, which can be severe enough to compromise the voice communications between UE 105-2 and UE 105-4, and thus cause application data flows ADFs2 to violate their E2E QoS requirements.

Because NMS 150 measures traffic at the segment level for each ADF, it can detect that application data flow ADFs2 is experiencing backpressure in the segment associated with wireless channel 107-2. NMS 150 may then determine how to allocate resources in other segments of network environment 100 which are traversed by ADFs2 in order to improve E2E performance. To determine how to allocate resources, NMS 150 also monitors network element status throughout the network, and may thus determine which network locations have enough spare resources or can re-allocate resources to effectively increase the performance of ADFs2. In some embodiments, optimization techniques may be used to find one or more network locations which can have the greatest impact in improving the E2E performance of ADFs2, while having enough network resources available to maintain E2E performance compliance of other ADFs within network environment 100. Once NMS 150 determines the network location for allocating additional resources to application data flow ADFs2, NMS 150 may issue QoS reconfiguration commands to network element at the determined network location for allocating more resources to ADFs2, and thus "speeding up" the packets to compensate for the backpressure cause by wireless channel 107-2. The QoS reconfiguration commands may effectively adjust QoS parameters (e.g., QoS "markings") to increase network resources to ADFs2, thus permitting ADFs2 to meet their E2E performance requirements. Once the signal conditions of wireless channel 107-2 improve, NMS 150 may detect the increased traffic flow across this segment, and readjust the QoS parameters in the E2E path accordingly to reassign the network resources if they are no longer required to maintain the E2E performance requirements of ADFs2.

Further referring to FIG. 1, intermediary network 120 may be any type network which supports one or more eNodeBs 110 for interfacing with ePC 130. Intermediary network 120 may include Cell Site Routers (CSRs), Extended Back Haul (EBH) network(s), optical networks which include wavelength division multiplexed (WDM) optical components, multiservice provisioning platforms (MSPPs), metro-Ethernet networks, etc. Details of an embodiment for an intermediary network 120 are presented in further detail in reference to FIG. 2.

EPC 130 may be a core networking infrastructure that provides mobility management, session management, authentication, and packet transport to support UEs 105 and eNodeBs 110 for wireless communication, and further provide wireless networking elements access to WAN 140. ePC may be compatible with known wireless standards which may include, for example, LTE, LTE Advanced, Global System for Mobile Communications (GSM), Universal Mobile Telecommunications System (UMTS), IS-2000, etc. Details of an embodiment of ePC 130 are discussed below in reference to FIG. 3.

NMS 150 may be any type of networking device which may measure and track ADFs at the segment level throughout networking environment 100. NMS may employ measuring devices, such as, for example, packet trace traps (PTTs), at network segments and/or network elements to measure actual network traffic of packets. In other embodiments, where the actual measurement of packet flow is impractical, network traffic may be predicted using conventional techniques. In an embodiment, the NMS 150 may communicate with any of the network elements of networking environment 100 through WAN 140. Alternatively, NMS 150 may obtain access to the segments and network elements through ePC 130 and/or intermediary network 120. Details of an embodiment of NMS 150 are discussed below in reference to FIGS. 4 and 7.

ENodeB 110 may be any type of base station that can be included within any type of radio access network, and can be compatible with known wireless standards. Such standards may include, for example, LTE, LTE Advanced, GSM, UMTS, IS-2000, etc. In some embodiments, eNodeB 110 may be a wireless access point which can service any type of WiFi standard (e.g., any IEEE 801.11x network, where x=a, b, c, g, and/or n), and/or include any other type of wireless network technology for covering larger areas, and may include a mesh network (e.g., IEEE 801.11s) and/or or a WiMAX IEEE 802.16. Details of an embodiment of an eNodeB are discussed below in reference to FIG. 5.

UE 105 may include any type of mobile device having communication capabilities, and thus communicate with eNodeB 110 using a variety of different wireless channels. In some embodiments, the mobile device may communicate with network environment 100 using a wired connection. Thus UE 105 may be a mobile device that may include, for example, a cellular radiotelephone, a smart phone, a tablet, a set-top box (STB), a mobile phone, an type of IP communications device, a Voice over Internet Protocol (VoIP) device, a laptop computer, a palmtop computer, a gaming device, a media player device, or a digital camera that includes communication capabilities (e.g., wireless communication mechanisms). In various embodiments, the wireless channel 107 may be supported by any cellular radio access network (RAN), such as, for example, an LTE eUTRAN. In other embodiments, the wireless channel 107 may be supported by a local or wide area wireless network. A local area wireless network may include any type of WiFi (e.g., any IEEE 801.11x network, where x=a, b, c, g, and/or n). A wide area wireless network may include any type wireless network covering larger areas, and may include a mesh network (e.g., IEEE 801.11s) and/or or a WiMAX IEEE 802.16. Details of an embodiment of a UE are discussed below in reference to FIG. 6.

WAN 140 may be any type of wide area network connecting back-haul networks and/or core networks, and may include a metropolitan area network (MAN), an intranet, the Internet, a cable-based network (e.g., an optical cable network), networks operating known protocols, including Asynchronous Transfer Mode (ATM), Optical Transport Network (OTN), Synchronous Optical Networking (SONET), Synchronous Digital Hierarchy (SDH), Multiprotocol Label Switching (MPLS), and/or Transmission Control Protocol/Internet Protocol (TCP/IP).

Figure 2:
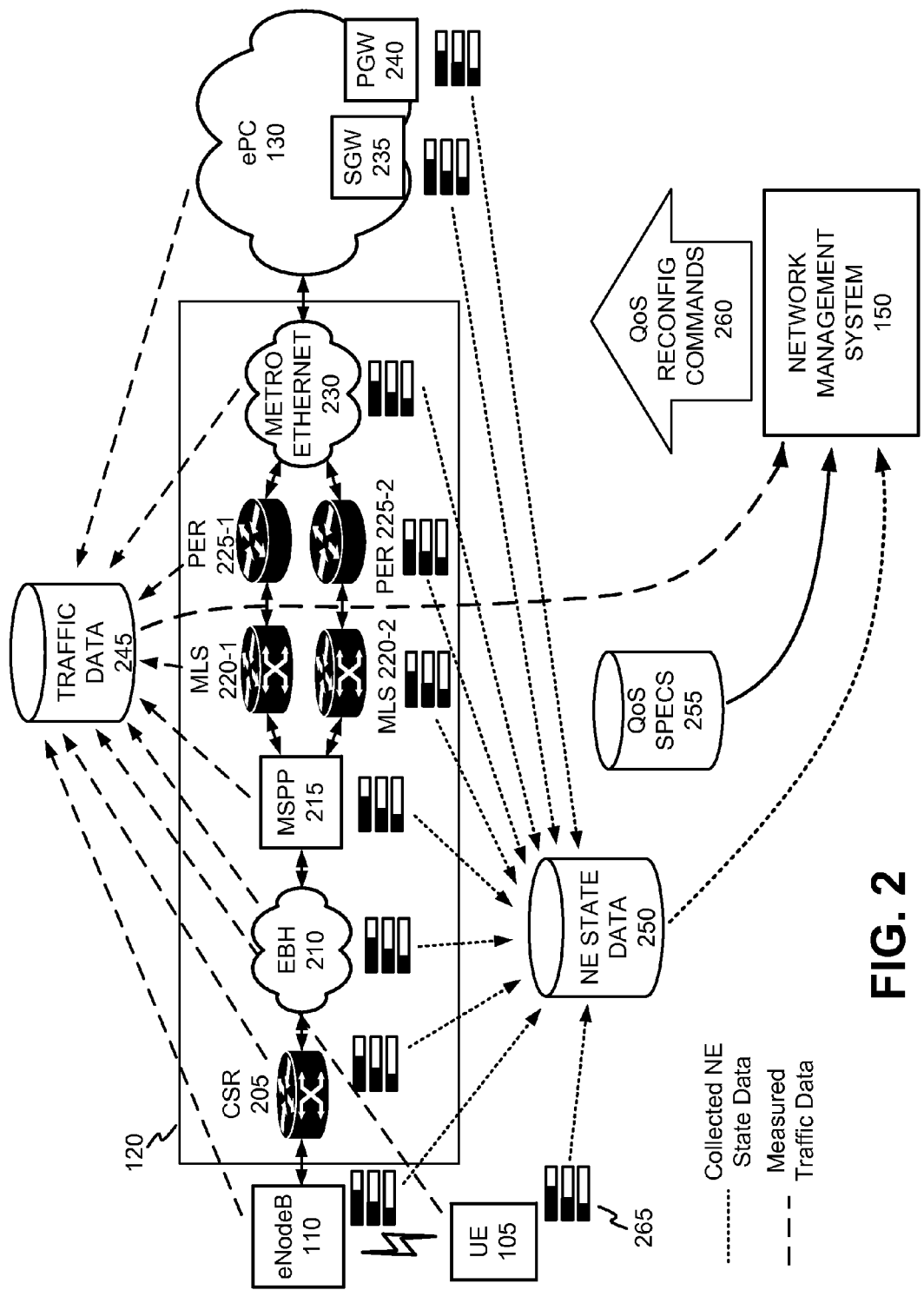
FIG. 2 is a block diagram depicting exemplary details of the network environment shown in FIG. 1.

FIG. 2 is a block diagram depicting exemplary details of network environment 100 shown in FIG. 1, which includes UE 105, eNodeB 110, and intermediary network 120. Intermediary network 120 may further include a Cell Site Router (CSR) 205, an Extend Back Haul (EBH) network 210, a Multi-Service Provisioning Platform (MSPP) 215, Multi-Layer Switches (MLS) 220 (collectively referred to as "MLSs 220" and individually as "MLS 220-$x$"), Provider Edge Router (PER) 225 (collectively referred to as "PER 225" and individually as "PER 225-$x$"), metro Ethernet 230, and ePC 130. EPC 130 may further include a Serving Gateway (SGW) 235 and a Packet Gateway (PGW) 240. FIG. 2 further shows that NMS 150 may utilize a number of data sets associated with network environment 100, which can include traffic data storage 245, network element state data storage 250, and QoS Specifications storage 255. For ease of explanation, only a limited number of network elements are shown in the network environment 100 depicted in FIG. 2. However, it should be understood that a greater number of network elements may be part of network environment 100, including other types of known network entities not illustrated. Other embodiments may include additional or different network entities in alternative configurations than which are exemplified in FIG. 2.

As noted above in the description of FIG. 1, UEs 105 may communicate with eNodeB 110 over a wireless channel to exchange ADFs. ENodeB 110 may then exchange ADFs with intermediary network 120 over a standard connection (e.g., an S1 interface). Specifically, in an embodiment, eNodeB 110 may interface with CSR 205 to exchange ADFs with EBH network 210. The EHB 210, which may also interface with a plurality of eNodeBs 110 (not shown), is capable of handling the traffic from multiple eNodeBs 110, and may include optical networks for exchanging ADFs with MSPP 215. The MSPP 215 may provide a bridge to network elements using a Multiprotocol Label Switching (MPLS) transport standard, thus providing two paths for interfacing with MLS 220. MLS 220 may transport the ADFs over MPLS to PER 225. The PER 225 may terminate the MPLS paths at metro Ethernet 230. Metro Ethernet 230 may further exchange ADFs with ePC 130.

NMS 150 may measure traffic data throughput for the entire network at a granular level, which may include measuring traffic at selected segments and/or network elements. Raw traffic may be measured using one or packet trace traps (PTTs) placed within network segments and/or across selected network elements to measure traffic flow. As shown in FIG. 2, traffic data may be measured at any element and/or segment and subsequently stored in traffic data storage 245 (traffic collection and storage being represented by coarse dashed lines shown in FIG. 2). Measurements at segments and/or network elements may be combined along the paths of ADFs, so that an ADF may be identified and tracked E2E across the entire network using the measured traffic data. Thus, given the granularity of the measurements, the NMS 150 may use the measured traffic data 250 to perform the E2E tracking of ADFs on a per segment basis. Because each ADF may be uniquely identified, it may also be tracked on per subscriber, per QoS basis, and/or per application basis. An ADF may be uniquely identified using a "5-tuple" identifier, which may include an internet protocol (IP) source address, and IP destination address, a source port number, a destination port number, and protocol information (e.g., TCP or UDP).

NMS 150 may further use QoS Specifications 255 to determine whether the measured ADFs are within specification in terms of bandwidth, packet delay, etc. QoS Specifications 255 may be determined prior to network management, which may be determined using prior traffic measurements, predictive models, or a combination thereof. For example, QoS Specifications 255 may be determined using statistical characterizations of the measured traffic data before NMS 150 performs management operations. By comparing the measured traffic data 245 with the QoS Specifications 255, NMS 150 may determine which segments in the network are out of specification, and can pinpoint network location(s) where traffic congestion occurs for each ADF. For any ADFs which traverse network segment(s) experiencing congestion, the NMS 150 may further determine whether this congestion affects an ADF to the extent where the ADF will not meet its E2E performance specifications. If an affected ADF cannot comply with its E2E performance requirement, then NMS 150 may reallocate network resource and thus compensate the affected ADF to bring it back into compliance with its E2E specifications. In an embodiment, NMS 150 may compensate for traffic congestion in one or more network segments by adjusting QoS parameters for one or more network elements within the E2E path traversed by the affected ADFs. By properly selecting the network location(s), the types of QoS parameter(s), and/or the QoS parameter values, the QoS of the affected ADF adjusted to speed up its packets in one or more network locations to compensate for the segment(s) experiencing backpressure.

In order to determine one or more network locations to make the QoS adjustments, NMS 150 will also collect information regarding the state of network elements (NEs) at different locations throughout the network, and store this information in NE state data storage 250. The collection of NE state data and its storage is represented by the fine dashed lines shown in FIG. 2. NE state data 250 can provide an indication of the "spare" resources a network element has available for reallocation that may be used to compensate ADFs affected by backpressure. For example, in an embodiment illustrated in FIG. 2, the NE state data 250 may represent the status of packet queues used in the network elements and sub-networks. For example, UE 105 may have packet queues 265 that may be monitored by NMS 150 and have representative data stored in NE state data storage 250. While each queue shown in FIG. 2 is not individually provided a reference number for drawing clarity, it should be understood that other network elements (e.g., eNodeB 110, CSR 205, MSPP 215, MLS 220, PER 225, SGW 235, and PGW 240) and sub-networks (e.g., EBH network 210, metro Ethernet 230, and ePC 130) may have one or more queues which can be monitored and have representative data stored in NE state data storage 250. NMS 150 may use the NE state data 250 to select the best network location(s) for allocating additional resources to compensate ADFs affected by backpressure, while not removing resources from other ADFs to the point where they no longer comply with their E2E performance requirements.

Accordingly, in the network location(s) selected by NMS 150 based on NE state data 250, an affected ADF may be granted additional network resources in any segment(s) of the E2E path, so that the affected ADF meets its E2E performance requirements, while other unaffected ADFs are allowed to retain sufficient network resources for their E2E performance compliance. The resources may be adjusted by changing QoS parameters in the packets of the affected ADF at the selected network locations to appropriately control both affected ADFs and unaffected ADFs. The change in QoS parameters may be accomplished through a QoS Reconfiguration Command 260 which may directed to a network element associated with the selected location. In one embodiment, NMS 150 may re-mark a Differentiated Services Code Point (DSCP) markings packets of the affected ADF to control packet flow. Once packets are re-marked, a network element at the selected location may allocate resources in accordance with the re-marking. For example, the QoS re-marking may increase the priority of packets in the affected ADF, thus decreasing their latency in order to meet its E2E performance requirements. The NMS 150 can monitor the entire network in an ongoing manner, so if the source of the backpressure is addressed in the affected segment, then the QoS re-marking may be may be temporary, and subsequent QoS Reconfiguration Commands 260 can change the QoS parameters to revert back to their nominal values.

In an embodiment, NMS 150 may use prior heuristics and/or iterative techniques to determine what combinations of network locations, QoS parameter types, and/or QoS values can adequately manage the network so that all ADFs meet E2E performance requirements. In some embodiments, NMS 150 may allocate network resources using optimization algorithms, such as, for example, optimization techniques for addressing nondeterministic polynomial time (NP) complete problems. In some embodiments, the optimization algorithms may maximize improvements in E2E performance for affected ADFs while minimizing the E2E performance impacts to unaffected ADFs, while other embodiments may utilize approximations which determine sub-optimal configurations, but nevertheless effective in managing the network so all ADFs meet E2E requirements.

Traffic data 245 may represent individual packet measurements which may be correlated to their associated ADFs. Packets may be counted within segments and/or network elements using packet trace traps (PTTs), and their speeds derived using packet time tags. For example, traffic data passing through a particular element may be measured by PTTs in segments surrounding that particular network element. In alternate embodiments, PTTs may be placed in a network element (such as, for example, in UE 105) to directly measure packet flow in the network element itself.

NE state data 250 may be used to characterize resource allocation within any network element in the E2E path, and can be used to determine the best network locations for adjusting the QoS parameters of packets in an ADF suffering backpressure. In an embodiment, the NE state data may characterize queuing performance in a network element, which could include data representing queue backlog (e.g., how full the queues are as a function of QoS level), queue latency, dropped packet statistics, queuing algorithm selection, queue weighting parameters, etc.

QoS Specifications 255 may be determined prior to being used by NMS 150, and can be derived using prior traffic measurements, existing QoS industry/supplier provided specifications, predictive models, or any combination thereof. The measured traffic 245 may be used in an ongoing manner to update QoS Specifications 255 and keep them current. QoS Specifications 255 may include packet delays, jitter, response time, throughput, bandwidth, reliability values such packet loss, time to failure, etc. Moreover, QoS Specifications 255 can be provided at a much finer level of detail that conventional QoS specifications. For example, instead of simply being delineated by application type, QoS Specifications 255 may be specified for a particular network topology, and thus be specified on a per segment basis, in addition to being specified on a per QoS level, and/or per application type basis. Additionally, QoS Specifications 255 may include actual E2E ADF specifications on a per QoS and/or per application type basis. In some embodiments, the E2E specifications may be derived based on the network topology and the QoS Specifications 255 provided for each network segment within an E2E network path.

CSR 205 may mange the connection between eNodeB 110 and the EBH network 210. CSR 205 may also be used to manage connections with legacy base stations which may be present at the same site as eNodeB 110. Typically, one CSR 205 may be used per eNodeB 110 to connect with EBH network 210. EBH network 210 may interface with a plurality of eNodeBs 110 and serve as an aggregation point for a eUTRAN to connect with the ePC. Each eNodeB 110 may connect through a separate CSR 205. EBH network 210 may be configured to support high bandwidth transport and can include WDM optical networking components.

MSPP 215 may provide a bridge to network elements which are MPLS based (e.g., MLS 220 and PER 225). MSPP 215 may and can improve the efficiency of optical networks for transporting multiservice traffic. MSPP 215 may handle a range of physical interfaces, and may support telephony interfaces (e.g., DS-1, DS-3), optical interfaces (e.g, OC-3, OC-12), and Ethernet interfaces (e.g., 10/100Base-T, Gigabit).

MLSs 220 and PERs 225 may be configured to operate in pairs as shown in FIG. 2 for use with the MPLS transport standard. MPLS is a high performance transport which offers flexibility for different services and can avoid complex routing algorithms by using short path labels to transport packets. MPLS operates at a layer that is considered to lie between OSI Layer 2 (data link layer) and OSI Layer 3 (network layer). MLSs 220 switch packets at multiple layers (Layer 2 and above) and prioritize packets using DSCP QoS markings. PERs 225 may operate at the edge of the MPLS network as gateways to the metro Ethernet network 230.

Metro Ethernet 230 may be a Community of Interest Network (COIN) which exchanges ADFs with ePC 130. Details regarding ePC SGW 235 and PGW 240 are discussed below in relation to the description of FIG. 3.

Figure 3:
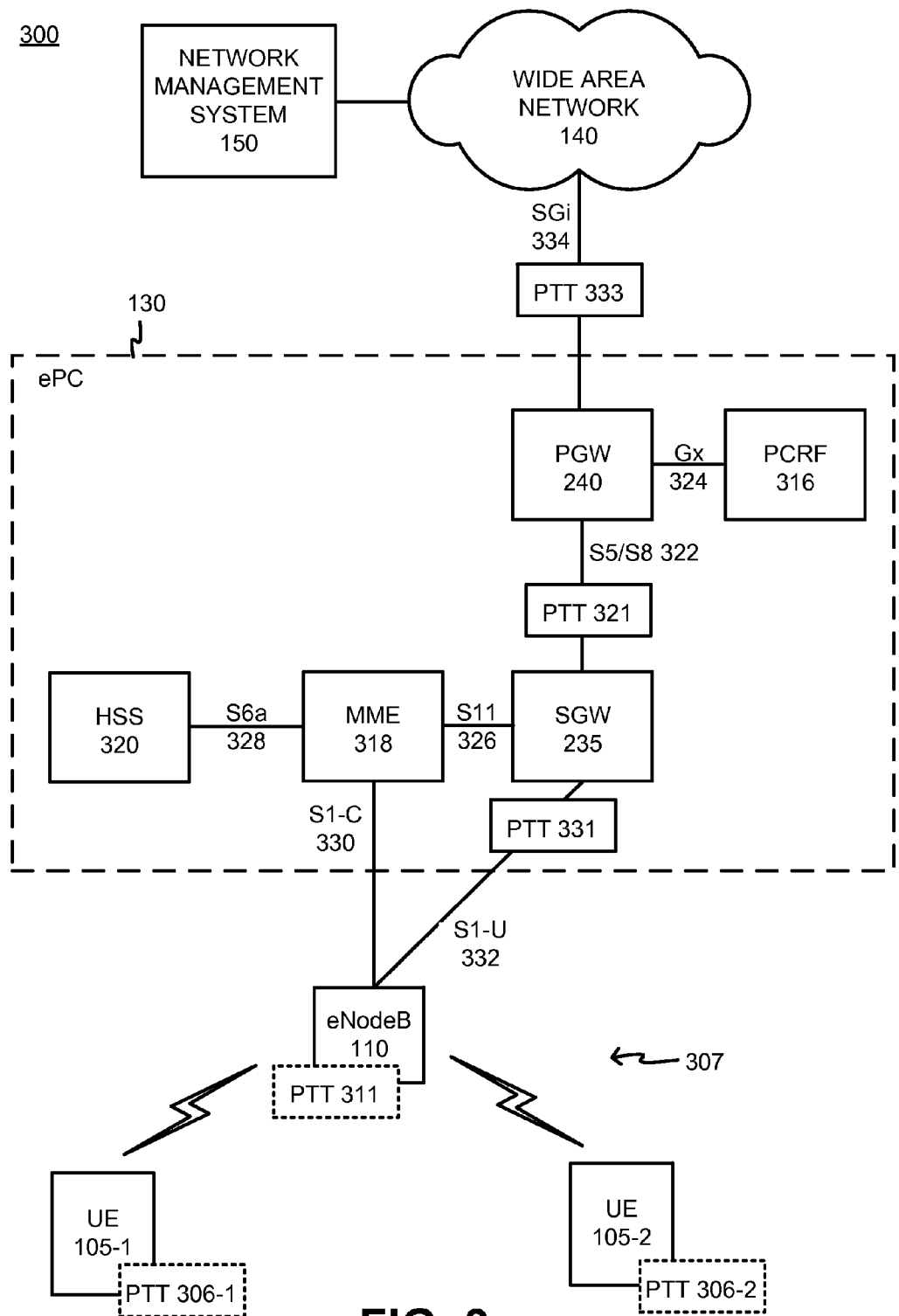
FIG. 3 is a block diagram illustrating details of an exemplary wireless network which may be included in the E2E network shown in FIG. 1.

FIG. 3 is a block diagram of a network 300 which illustrates exemplary details of network environment 100 shown in FIG. 1, which includes UE 105, eNodeB 110, ePC 130, WAN 140, and NMS 150. EnodeB 110 may be part of an evolved Universal Mobile Telecommunications System (UMTS) Terrestrial Radio Access Network (eUTRAN) 307. While the network elements shown in network 300 are presented in the context of an LTE network, it should be appreciated that embodiments presented herein may operate in any appropriate wireless network(s).

Network 300 may further include one or more devices that are physical and/or logical entities interconnected via standardized interfaces. Network 300 provides wireless packet-switched services and wireless IP connectivity to UEs 105 to provide, for example, data, voice, and/or multimedia services. The ePC 130 may further include a mobility management entity (MME) 318, SGW device 235, PGW 240, a Policy and Charging Rules Function (PCRF) 316, and a home subscriber server (HSS) 320. It is noted that FIG. 3 depicts a representative networking system 300 with exemplary components and configuration shown for purposes of explanation. Other embodiments may include additional or different network entities in alternative configurations than which are exemplified in FIG. 3.

Further referring to FIG. 3, each eNodeB 110 may include one or more devices and other components having functionality that allow UE 105 to wirelessly connect to eUTRAN 307. eNodeB 110 may interface with ePC 130 via a S1 interface, which may be split into a control plane S1-C interface 330 and a data plane S1-U interface 332. S1-C interface 330 may interface with MME device 318. S1-C interface 330 may be implemented, for example, with a protocol stack that includes a Network Access Server (NAS) protocol and/or Stream Control Transmission Protocol (SCTP). S1-U interface 332 may interface with SGW 235 and may be implemented, for example, using a General Packet Radio Service Tunneling Protocol version 2 (GTPv2). eNodeB 110 may communicate with other eNodeBs via an X2 interface (not shown). The X2 interface may be implemented, for example, with a protocol stack that includes an X2 application protocol and SCTP. Further shown are a number of Packet Trace Traps (PTTs) 306 (collectively referred to as "PTT 306" and individually as "PTT 306-*x*"), 311 which may be placed in the eUTRAN 307 for measuring traffic data 245 therein. For example, PTT 306-1 may reside directly in UE 105-1, and PTT 306-2 may be located in UE 105-2 to measure traffic data 245 flowing through the UEs 105. PTT 311 may be located in eNodeB 110 to measure traffic data 245 flowing through eNodeB 110.

Additionally, to measure traffic data 245 flowing through S1-U 332, one or more PPTs 331 may be located therein.

MME device 318 may implement control plane processing for network 300. For example, MME device 318 may implement tracking and paging procedures for UE 105, may activate and deactivate bearers for UE 105, may authenticate a user of UE 105, and may interface to non-LTE radio access networks. A bearer may represent a logical channel with particular QoS requirements, and can be used in some embodiments to control packet flows as described herein. MME device 318 may also select a particular SGW 235 for a particular UE 105. A particular MME device may interface with other MME devices (not shown) in ePC 130 and may send and receive information associated with UEs 105, which may allow one MME device to take over control plane processing of UEs 105 serviced by another MME device, if the other MME device becomes unavailable.

SGW 235 may provide an access point to and from UE 105, may handle forwarding of data packets for UE 105, and may act as a local anchor point during handover procedures between eNodeBs 110. While not shown in FIG. 3, SGW 235 may also include an internal PTT to measure traffic data 245 flowing through SGW 235. SGW 235 may interface with PGW 240 through an S5/S8 interface 322. S5/S8 interface 322 may be implemented, for example, using GTPv2. Additionally, one or more PTTs 321 may be located in S5/S8 interface to measure traffic data flowing between SGW 235 and PGW 240.

PGW 240 may function as a gateway to WAN 140 through a SGi interface 334. One or more PTTs 333 may be placed in SGi interface 334 to measure traffic data 245 between PGW 240 and WAN 140. WAN 140 may include, for example, an IP Multimedia Subsystem (IMS) network, which may provide voice and multimedia services to UE 105, based on Session Initiation Protocol (SIP). A particular UE 105, while connected to a single SGW 235, may be connected to multiple PGWs 240, one for each packet network with which UE 105 communicates.

PCRF 316 provides policy control decision and flow based charging control functionalities. PCRF 316 may provide network control regarding service data flow detection, gating, QoS and flow based charging, etc. PCRF 316 may determine how a certain service data flow shall be treated, and may ensure that user plane traffic mapping and treatment is in accordance with a user's subscription profile. PCRF 316 may communicate with PGW 240 using a Gx interface 324. Gx interface 324 may be implemented, for example, using a Diameter protocol. The Gx interface may not have a PTT since it does not transfer traffic data 245. MME device 318 may communicate with SGW 235 through an S11 interface 326. S11 interface 326 may be implemented, for example, using GTPv2. S11 interface 326 may be used to create and manage a new session for a particular UE 105. S11 interface 326 may be activated when MME device 318 needs to communicate with SGW 235, such as when the particular UE 105 attaches to ePC 130, when bearers need to be added or modified for an existing session for the particular UE 105, when a connection to a new PGW 240 needs to created, or during a handover procedure (e.g., when the particular UE 105 needs to switch to a different SGW 235).

HSS device 320 may store information associated with UEs 105 and/or information associated with users of UEs 105. For example, HSS device 320 may store user profiles that include authentication and access authorization information. MME device 318 may communicate with HSS device 320 through an S6a interface 328. S6a interface 328 may be implemented, for example, using a Diameter protocol.

NMS 150 may interface to the ePC 130 through WAN 140 to receive traffic data 245 from the PTTs, and provide QoS reconfiguration commands 260 to the appropriate network elements in ePC 130 and/or eUTRAN 307.

Wide Area Network 140 may include any type wired and/or wireless network covering larger areas. For example, WAN 140 may include a metropolitan area network (MAN), an Optical Transport Network (OTN) backbone network, a fiber optic-based network, and/or a combination of these or other types of networks. WAN 140 may be an IP based network or utilize MPLS, and may include a mesh network (e.g., IEEE 801.11 s) and/or or a WiMAX IEEE 802.16.

Further referring to FIG. 3, multiple elements in ePC 130 perform various functions which for implementing QoS and policy management. As noted above, PCRF 316 may be the policy server in ePC 130. PCRF 316 may take the available network information and operator-configured policies to create service session-level policy decisions. The decisions, known as Policy and Charging Control (PCC) rules, are forwarded to a policy and charging enforcement function (PCEF) (not shown) located in PGW 240. The PCEF enforces policy decisions by establishing bearers, mapping service data flows to bearers, and performing traffic policing and shaping. In one example, PGW 240 maps bearers to the underlying transport network. The transport network will typically be Ethernet based, and may use MPLS. The transport may not be aware of the bearer concept and will use standard IP QoS techniques, such as DiffServ. ENodeB 110 plays a role in end-to-end QoS and policy enforcement, and performs uplink and downlink rate policing, as well as scheduling resource blocks which are transmitted over the wireless channel. EnodeB 110 may use Allocation and Retention Policy (ARP) when allocating bearer resources. The effectiveness of resource block scheduling algorithms in eNodeBs 110 can have a significant impact on service quality and overall network performance. UE 105 may also perform functionality which impacts policy in the uplink direction, as it performs the initial mapping of service data flows to bearers.

While FIG. 3 shows exemplary components of network 300, in other implementations, network 300 may include fewer components, different components, differently arranged components, or additional components than depicted in FIG. 3. Additionally or alternatively, one or more components of network 300 may perform functions described as being performed by one or more other components.

Figure 4:
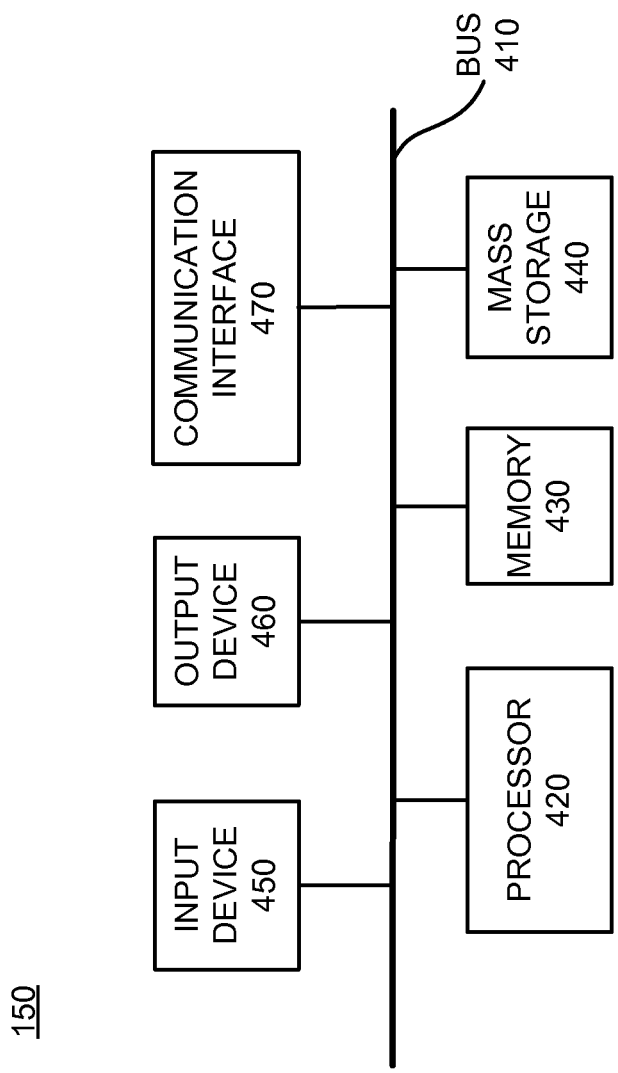
FIG. 4 is a block diagram showing exemplary components of a network management device according to an embodiment.

FIG. 4 is a block diagram showing exemplary components of NMS 150 according to an embodiment. NMS 150 may include a bus 410, a processor 420, a memory 430, mass storage 440, an input device 450, an output device 460, and a communication interface 470.

Bus 410 includes a path that permits communication among the components of network element 400. Processor 420 may include any type of single-core processor, multi-core processor, microprocessor, latch-based processor, and/or processing logic (or families of processors, microprocessors, and/or processing logics) that interprets and executes instructions. In other embodiments, processor 420 may include an application-specific integrated circuit (ASIC), a field-programmable gate array (FPGA), and/or another type of integrated circuit or processing logic. For example, processor 420 may be an x86 based CPU, and may use any operating system, which may include varieties of the Windows, UNIX, and/or Linux. Processor 420 may also use high-level analysis software packages and/or custom software written in any programming and/or scripting languages for interacting with other network entities are communicatively coupled to WAN 140.

Memory 430 may include any type of dynamic storage device that may store information and/or instructions, for execution by processor 420, and/or any type of non-volatile storage device that may store information for use by processor 420. For example, memory 430 may include a RAM or another type of dynamic storage device, a ROM device or another type of static storage device, and/or a removable form of memory, such as a flash memory. Mass storage device 440 may include any type of on-board device suitable for storing large amounts of data, and may include one or more hard drives, solid state drives, and/or various types of RAID arrays. For NMS 150, mass storage device 440 may be suitable for storing files associated with traffic data 245, NE State data 250, and/or QoS Specifications 255. NMS 150 may use the stored data to determine the network location for allocating resources so ADFs conform to their respective E2E performance requirements.

Input device 450, which may be optional, can allow an operator to input information into NMS 150, if required. Input device 450 may include, for example, a keyboard, a mouse, a pen, a microphone, a remote control, an audio capture device, an image and/or video capture device, a touch-screen display, and/or another type of input device. In some embodiments, NMS 150 may be managed remotely and may not include input device 450. Output device 460 may output information to an operator of NMS 150. Output device 460 may include a display (such as an LCD), a printer, a speaker, and/or another type of output device. In some embodiments, NMS 150 may be managed remotely and may not include output device 460.

Communication interface 470 may include a transceiver that enables NMS 150 to communicate with WAN 140 to provide QoS reconfiguration commands 260 to network elements and receive traffic data from various PTTs (e.g., PTTs 306, 311, 331, 321, 333). The communications interface 470 may be configured for wireless communications (e.g., RF, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 470 may include a transmitter that converts baseband signals to RF signals and/or a receiver that converts RF signals to baseband signals. Communication interface 470 may be coupled to one or more antennas for transmitting and receiving RF signals. Communication interface 470 may include a logical component that includes input and/or output ports, input and/or output systems, and/or other input and output components that facilitate the transmission/reception of data to/from other devices. For example, communication interface 470 may include a network interface card (e.g., Ethernet card) for wired communications and/or a wireless network interface (e.g., a WiFi) card for wireless communications. Communication interface 470 may also include standard serial communications over a cable, and/or any other type of interface that converts data from one form to another form.

NMS 150 may perform network management operations in response to processor 420 executing software instructions contained in a computer-readable medium, such as memory 430 and/or mass storage 440. The software instructions may be read into memory 430 from another computer-readable medium or from another device. The software instructions contained in memory 430 may cause processor 420 to perform processes described herein, such as, for example, process 800 depicted in FIG. 8. Alternatively, hardwired circuitry may be used in place of, or in combination with, software instructions to implement processes described herein. Thus, implementations described herein are not limited to any specific combination of hardware circuitry and software.

Although FIG. 4 shows exemplary components of NMS 150, in other implementations, NMS 150 may include fewer components, different components, additional components, or differently arranged components than depicted in FIG. 4.

Figure 5:
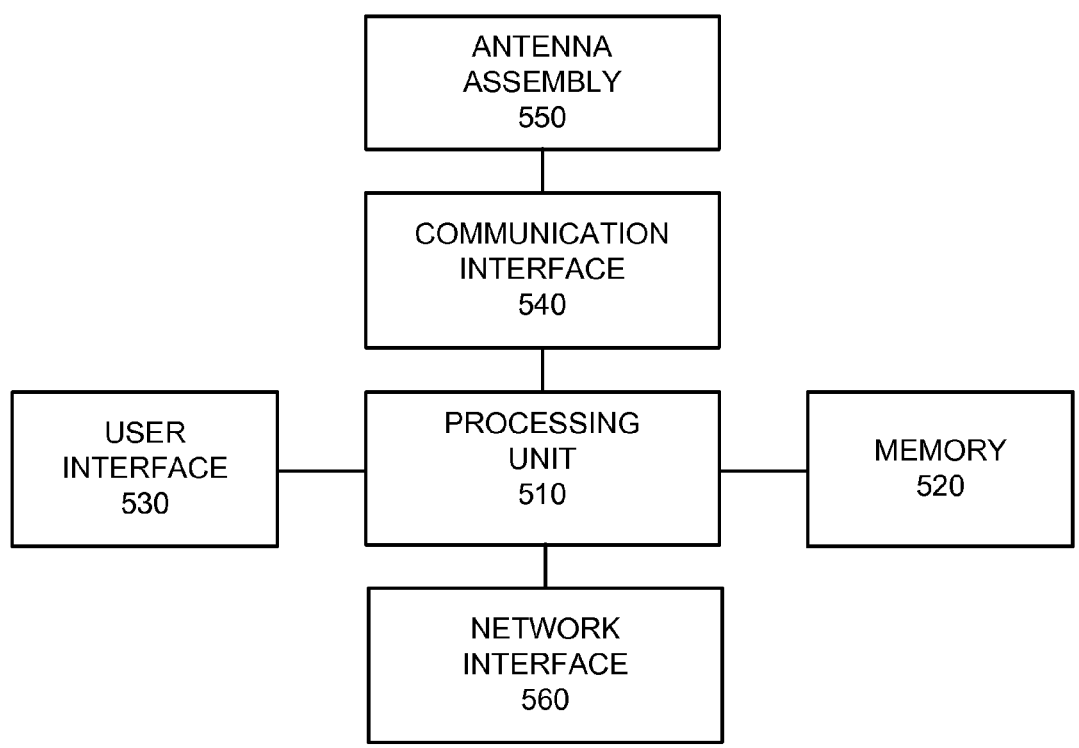
FIG. 5 is a block diagram illustrating an exemplary evolved Node B (eNodeB) which may be included in the radio access network (RAN) shown in FIG. 3.

FIG. 5 is a block diagram illustrating an exemplary eNodeB 110 which may be included in the evolved UMTS Radio Access Network (eUTRAN) 307 shown in FIG. 3. As shown in FIG. 5, eNodeB 110 may include a processing unit 510, a memory 520, a user interface 530, a communication interface 540, an antenna assembly 550, and a network interface 560.

Processing unit 510 may include one or more processors, microprocessors, ASICs, FPGAs, and/or other processing logic. Processing unit 510 may control operation of eNodeB 110 and its components.

Memory 520 may include a random access memory (RAM) or another type of dynamic storage device, a read only memory (ROM) or another type of static storage device, a removable memory card, and/or another type of memory to store data and instructions that may be used by processing unit 510.

User interface 530 may include mechanisms for inputting information to eNodeB 110 and/or for outputting information from eNodeB 110. Examples of input and output mechanisms might include a speaker to receive electrical signals and output audio signals; a microphone to receive audio signals and output electrical signals; buttons (e.g., a joystick, control buttons, a keyboard, or keys of a keypad) and/or a touchscreen to permit data and control commands to be input into eNodeB 110; a display, such as an Liquid Crystal Display (LCD), to output visual information; and/or any other type of input or output device. In some embodiments, eNodeB 110 may be managed remotely and may not include user interface 530. In other words, eNodeB 110 may be "headless" and may not include an input device and/or an output device.

Communication interface 540 may include one or more Radio Frequency (RF) transceivers that enable eNodeB 110 to communicate with mobile devices via wireless communications. An RF transceiver may include an RF transmitter that receives signals to be transmitted wirelessly and performs signal processing on the signals before providing the signals to antenna assembly 550, and an RF receiver that receives signals from antenna assembly 550 and performs signal processing on the received signals before providing the received signals to processing unit 510. For example, the RF transceiver may perform analog-to-digital and digital-to-analog conversion, modulation and demodulation, up-conversion and down-conversion, and/or amplification of signals.

Antenna assembly 550 may include one or more antennas to transmit and/or receive RF signals over the air. Antenna assembly 550 may, for example, receive RF signals from communication interface 540 and transmit the signals over the air and receive RF signals over the air and provide them to communication interface 540.

Network interface 560 may include a logical component that includes input and/or output ports, input and/or output systems, and/or other input and output components that facilitate the transmission of data to other devices via a backhaul link. For example, network interface 560 may include a network interface card (e.g., Ethernet card) for wired communications and/or a wireless network interface (e.g., a WiFi) card for wireless communications. Network interface 560 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As described herein, eNodeB 110 may perform certain operations in response to processing unit 510 executing software instructions contained in a computer-readable medium, such as memory 520. A computer-readable medium may be defined as a non-transitory memory device. A non-transitory memory device may include memory space within a single physical memory device or spread across multiple physical memory devices. The software instructions may be read into memory 520 from another computer-readable medium or from another device via communication interface 540. The software instructions contained in memory 520 may cause processing unit 510 to perform processes to facilitate E2E network management. For example, PTT 311 may be implemented using software instructions to measure traffic data 245 flowing through eNodeB 110. Alternatively, hardwired circuitry may be used in place of, or in combination with, software instructions to implement processes described herein. Thus, implementations described herein are not limited to any specific combination of hardware circuitry and software.

Although FIG. 5 shows example components of eNodeB 110, in other implementations, eNodeB 110 may include fewer components, different components, differently arranged components, or additional components than those depicted in FIG. 5. Additionally or alternatively, one or more components of eNodeB 110 may perform the tasks described as being performed by one or more other components of eNodeB 110.

Figure 6:
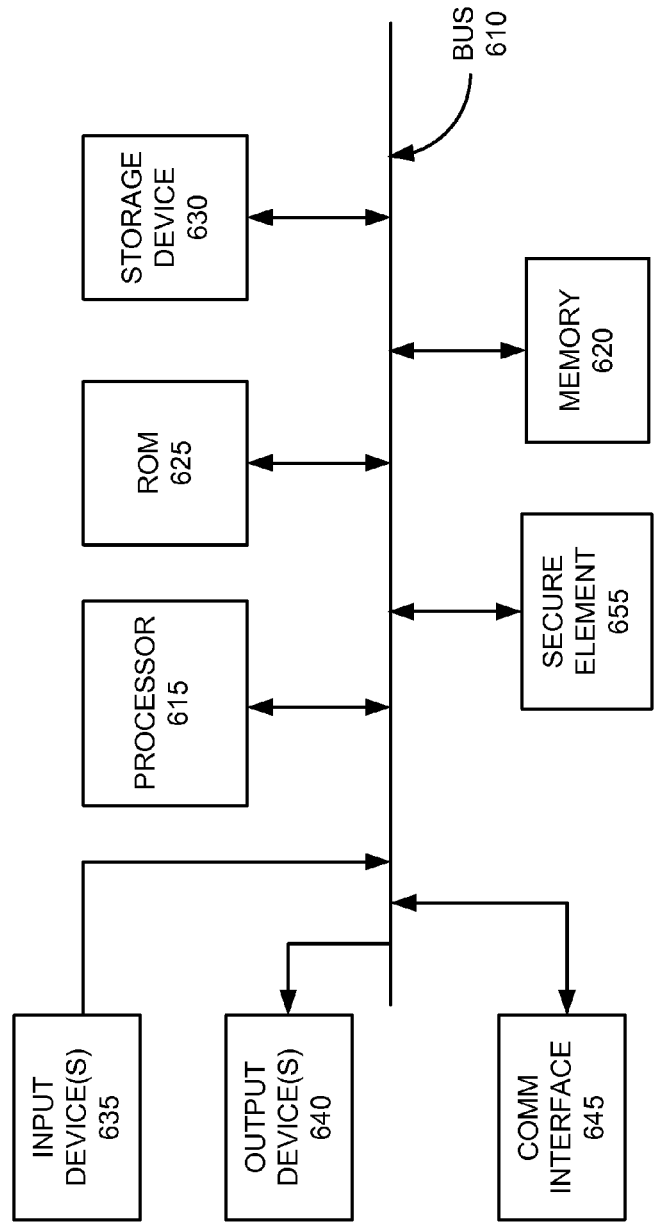
FIG. 6 is a block diagram illustrating an exemplary user equipment (UE) for accessing the radio access network shown in FIG. 3.

FIG. 6 is a block diagram illustrating an exemplary UE 105 for accessing the radio access network shown in FIG. 3. UE 105 may include any mobile or fixed communication device configured to communicate with eNodeB 110 via wireless signals. For example, UE 105 may include a portable communication device (e.g., a mobile phone, a smart phone, a phablet device, a global positioning system (GPS) device, and/or another type of wireless device); a telephone terminal; a personal computer or workstation; a server device; a laptop, tablet, or another type of portable computer; a media playing device; a portable gaming system; and/or any type of device with wireless communication capability.

UE 105 may include a bus 610, a processor 615, memory 620, a read only memory (ROM) 625, a storage device 630, one or more input device(s) 635, one or more output device(s) 640, a communication interface 645, and Secure Element (SE) 655. Bus 610 may include a path that permits communication among the elements of UE 105.

Processor 615 may include a processor, microprocessor, or processing logic that may interpret and execute instructions. Memory 620 may include a random access memory (RAM) or another type of dynamic storage device that may store information and instructions for execution by processor 615. ROM 625 may include a ROM device or another type of static storage device that may store static information and instructions for use by processor 615. Storage device 630 may include a magnetic and/or optical recording medium and its corresponding drive.

Input device(s) 635 may include one or more mechanisms that permit an operator to input information to UE 105, such as, for example, a keypad or a keyboard, a microphone, voice recognition, components for a touchscreen, and/or biometric mechanisms, etc. Output device(s) 640 may include one or more mechanisms that output information to the operator, including a display (e.g., an LCD), a speaker, etc. Communication interface 645 may include any transceiver mechanism that enables UE 105 to communicate with other devices and/or systems. For example, communication interface 645 may include mechanisms for communicating with another device or system via a network, such as eUTRAN 307.

Secure Element (SE) 655 may be inserted into a secure element interface (I/F) (e.g., a smart card or Subscriber Identifier Module (SIM) card interface) of UE 105. SE 655 is a tamper-resistant platform (e.g., a single-chip secure microcontroller) capable of securely hosting applications and their associated confidential and/or cryptographic data (e.g., key management) in accordance with the rules and security requirements set forth by a set of trusted authorities. SE 655 may securely store applications and data to permit UE 105 to perform trusted exchanges with other network entities. SE 655 may provide the security and confidentiality required to perform validation of a user's identity to the network environment 100. SE 655 may include, for example, a Universal Integrated Circuit Card (UICC), a removable user identity card (R-UIM), a subscriber identity module (SIM), a universal subscriber identity module (USIM), or an Internet Protocol (IP) multimedia services identity module (ISIM).

UE 105 may perform certain operations or processes, as may be described in detail below. UE 105 may perform these operations in response to processor 615 executing software instructions contained in a computer-readable medium, such as memory 620. A computer-readable medium may be defined as a physical or logical memory device. A logical memory device may include memory space within a single physical memory device or spread across multiple physical memory devices. The software instructions may be read into memory 620 from another computer-readable medium, such as storage device 630, or from another device via communication interface 645. The software instructions contained in memory 620 may cause processor 615 to perform operations or processes. For example, PTT 306 may be implemented using software instructions to measure traffic data 245 flowing through UE 105. Alternatively, hardwired circuitry may be used in place of or in combination with software instructions to implement processes consistent with the principles of the embodiments. Thus, exemplary implementations are not limited to any specific combination of hardware circuitry and software.

The configuration of components of UE 105 illustrated in FIG. 6 is for illustrative purposes only. It should be understood that other configurations may be implemented. Therefore, UE 105 may include additional, fewer and/or different components than those depicted in FIG. 6.

Figure 7:
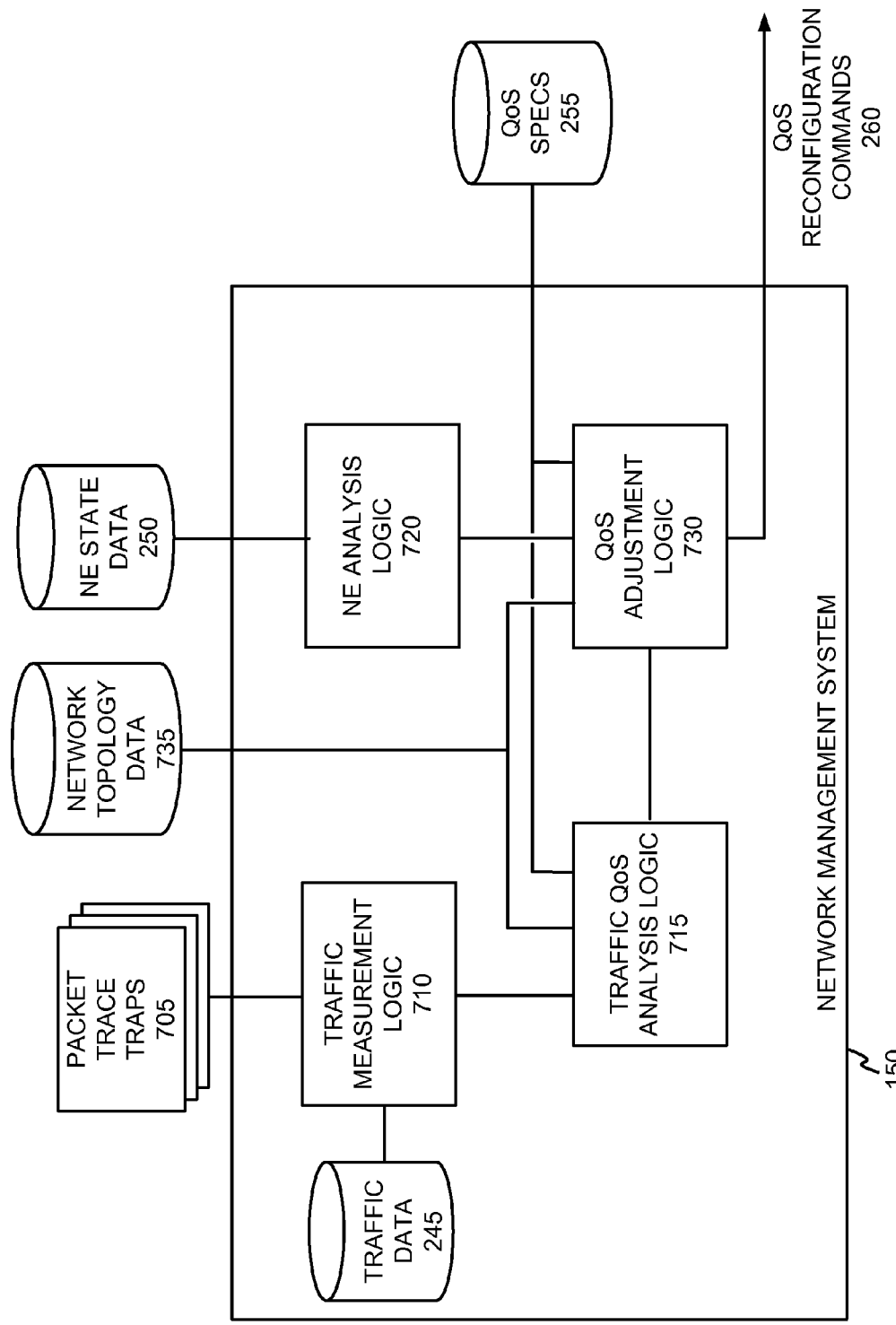
FIG. 7 is a diagram illustrating exemplary modules within the network management device shown in FIG. 4.

FIG. 7 is a diagram illustrating exemplary logic modules within NMS 150. NMS may include traffic measurement logic 710, traffic QoS analysis logic 715, Network Element (NE) analysis logic 720, QoS adjustment logic 730, and traffic data storage 245. These logic modules may be implemented via processor 420.

NMS 150 may be coupled to a plurality of PTT 705 (e.g., corresponding to PTTs 306, 311, 321,331, 333, etc.) which may be interspersed throughout network environment 100. One or more PTTs 705 may be placed or located in segments to measure traffic flow and/or placed within network elements (e.g. PTTs 306 and 311) to measure flow through the network element. In alternative embodiments, if PTTs cannot be located within a network element, PTTs 705 may be located at segments bounding the network element in order to measure traffic flowing through the network element. PTTs 705 may provide raw traffic data to traffic measurement logic 710, which may collect, preprocess, and/or store the raw traffic data in traffic data storage 245. Traffic measurement logic 710 may measure performance values of traffic data flows along the segments across the network such as, for example, speed, latency, and/or reliability of packets in traffic flows across segments and/or network elements.

Traffic QoS analysis logic 715 may receive measured traffic flow data 245 and then associate these packets with ADFs. This association can be done using the "5-tuple" information which may be found in packet headers, and thus the correspondence between user application and their associated QoS parameters can be established to identify each ADF on a per segment basis. Moreover, by associating the known network locations of each PTT and their measured traffic data, the ADFs may be tracked on a per segment basis. By comparing the ADF performance derived from the traffic data 245 with QoS Specifications 255, traffic QoS analysis logic 715 can identify application data flows, along with their corresponding network locations, which fail to meet the performance requirements for the segments across the network. Direct comparison of the measured ADF performance may be made on a per segment level because QoS Specifications 255 may be determined within the network to the granularity of the segment level throughout the network.

For ADFs which fail to meet performance requirements at the segment level, Traffic QoS analysis logic 715 may further determine which of these ADFs may fail to meet their E2E performance requirements due to the congestion measured at the network segments. It should be noted that in some cases, if congestion at a segment for a particular ADF is not that severe, it may not affect the ADF's overall E2E latency to the extent of failing to meet its QoS performance requirements. In other cases, where the ADF's E2E performance requirements are affected to the extent of not being met, NMS 150 may allocate resources from other network locations so all ADFs meet are within E2E performance compliance. Accordingly, by accessing network topology data 735 and destination address information associated with packets in the ADF, the actual E2E ADF performance can be determined at the granularity of the segment level. This information may be passed to QoS adjustment logic 730 so the affected ADFs may be compensated.

QoS adjustment logic 730 may receive the information characterizing ADFs affected by backpressure from traffic QoS analysis logic 715. This information may include which ADFs are delayed and/or the network location responsible for the backpressure causing the delay. QoS adjustment logic 730 may also receive the QoS Specifications 255 to assist in the determination of which QoS parameter to adjust, and how much of an adjustment should be made. Accordingly, QoS adjustment logic 730 may determine the amount and type of QoS adjustment which should be made, and the network location (which network element) associated with the QoS adjustment, to compensate the affected ADF for the network congestion. In order to determine the network location to perform the QoS adjustment, QoS adjustment logic 730 may receive NE state data 250 which may be collected and/or processed by NE analysis logic 720. NE analysis logic 720 can provide information indicating the level of "spare" network resources available for reallocation that are associated with the network elements. In an embodiment, NE state data 250 may include information regarding queue parameters, such as, for example, queue latency, queue weights, backlogs etc., for the network elements which may be used adjust QoS parameters. QoS adjustment logic 730 may find one or more appropriate locations which can allocate enough resources to compensate the affected ADF, while not adversely affecting the E2E performance compliance of other ADFs. In an embodiment, an optimization algorithm may be used to determine the QoS parameter types, their associated values, and the corresponding network location which would maximize the adjustment's impact on compensating the affected ADF, while minimizing any detrimental effects on other ADFs.

Once QoS adjustment logic 730 determines the QoS parameter adjustment and its network location, it may issue QoS reconfiguration command 260 to the network element at the determined network location to re-mark the packets of the affected ADFs. For example, by increasing the packets' QoS priority, the affected ADF may be "sped up" to compensate for the segment experiencing backpressure.

The logic blocks shown in FIG. 7 represent one example of how NMS 150 may be configured. Other embodiments may combine logic modules shown, or may include additional logic modules for performing other functionality. The logic blocks shown may be implemented in software, which may executes on one or more processor(s) (e.g., processor 420), or may be realized using dedicated hardware, or any combination thereof.

Figure 8:
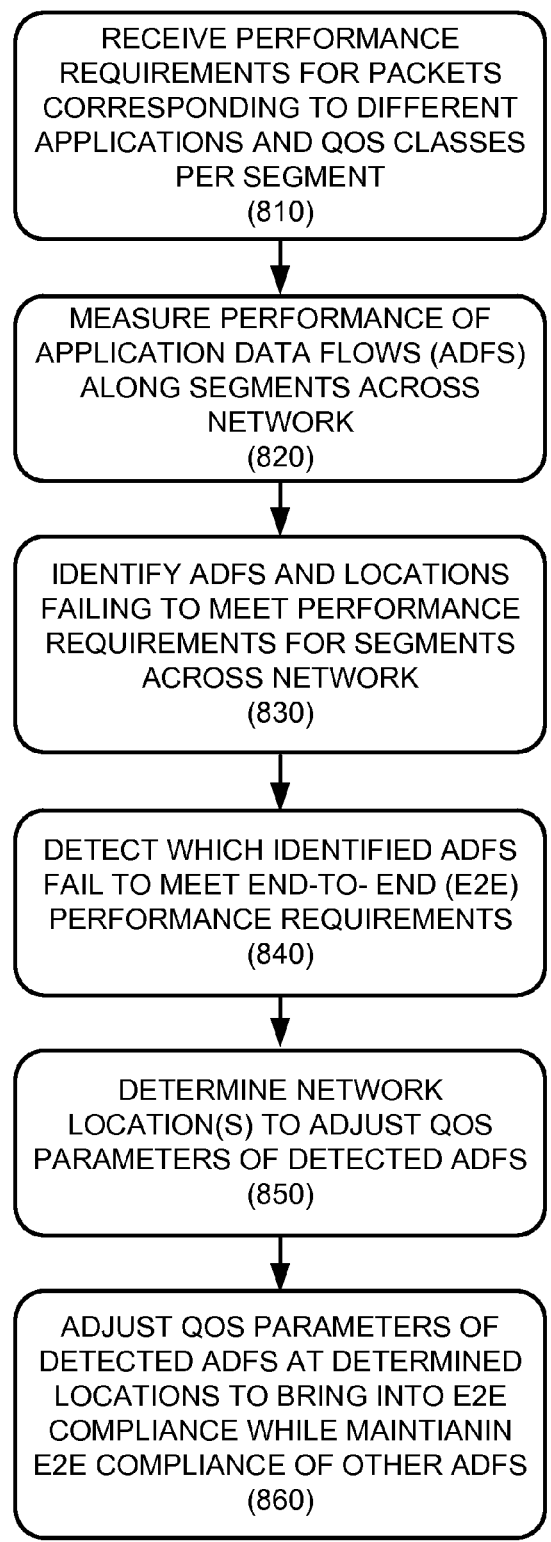
FIG. 8 is a flow chart showing an exemplary process for E2E network management based on Quality of Service (QoS) adjustments.

FIG. 8 is a flow chart showing an exemplary process 800 for E2E network management based on QoS adjustments. Process 800 may be performed by network device, such as, for example, NMS 150. In an embodiment, NMS 150 can manage E2E traffic across a network based on adjusting QoS parameters. NMS 150 may initially receive performance requirements for packets corresponding to different applications and QoS levels within segments across the network (810). The performance requirements may be provided within QoS Specifications 255 that further comprises minimum performance requirements for at least one of QoS levels or a plurality of application types, and may include, for example, packet delay budgets and/or maximum packet error loss rates.

NMS 150 may measure performance values of ADFs along the segments across the network (820), and in an embodiment place the measurements in traffic data storage 245. To measure the performance of ADFs, NMS 150 may use packet trace traps PTTs 705 (e.g., 306, 311, 321,331, 333, etc.) to measure traffic data, which may include timing and/or latency of packets across network segments and/or a network elements. NMS 150 may correlate the measured traffic data 245 to performance values of ADFs on a per application, per subscriber, per segment, and/or per QoS basis. NMS 150 may further calculate statistics of the collected performance values.

NMS 150 may then identify which ADFs that have performance values which fail to meet the performance requirements for the segments across the network, and further determine the associated network locations for these segments (830). In embodiment, NMS 150 may identify the ADFs by comparing the received performance requirements with the measured performance values for each segment traversed by the ADFs, which may be tracked on a per application, per subscriber, and/or per QoS basis. In an embodiment, the measured performance values may include time delay and/or packet loss for packets within the affected ADFs.

NMS 150 may detect application data flows which fail to meet their E2E performance requirements (840). These ADFs may be determined based on the identified application data flows which fail to meet the performance requirements for the segments across the network. NMS 150 may determine one or more network location(s) to adjust the QoS parameters of the detected ADFs (850). Details of an implementation for determining the network locations are described in more detail below in relation to FIG. 9.

NMS 150 may then adjust the QoS parameters of the detected ADFs at the network location(s) to bring the detected ADFs into compliance with their E2E performance requirements. This adjustment will also maintain E2E compliance of other application data flows traversing through the network element(s) at the determined network location(s) (860). For example, NMS 150 may increase the QoS priority of packets in the detected ADFs to speed up their flow and compensate for the segment experiencing backpressure. In one operational environment, NMS 150 may adjust the QoS parameters to permit ADFs which traverse wireless channels having poor signal conditions to maintain compliance with their E2E performance requirements. Details of one implementation for adjusting QoS parameters is described below in FIG. 10.

Figure 9:
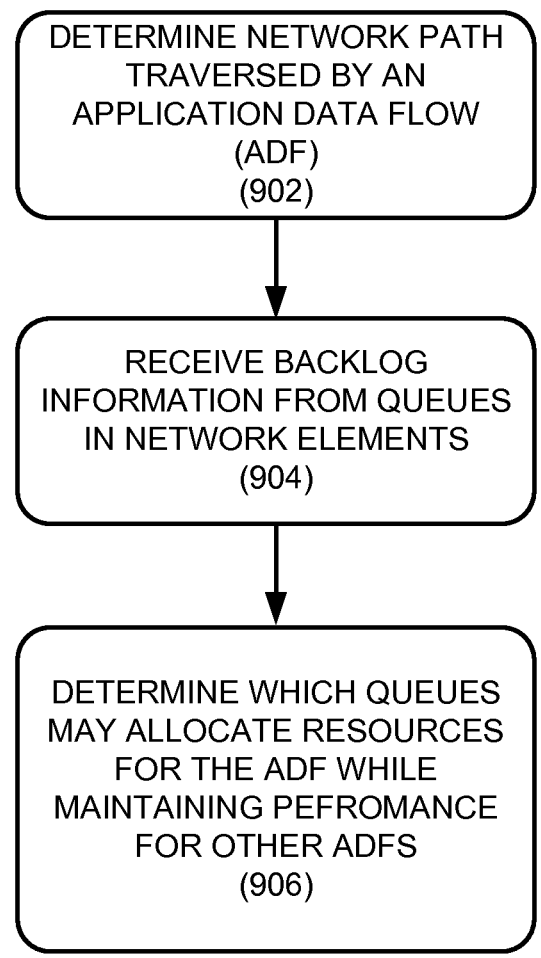
FIG. 9 is a flowchart showing an exemplary process to determine network locations for adjusting QoS parameters.

FIG. 9 is a flowchart showing an exemplary process 850 to determine network locations for adjusting QoS parameters. Process 850 may be performed by NMS 150, which may determine the network path traversed by the given ADF (902). The network path may be based on the destination address information associated with packets in the ADF (which is part of the "5-tuple" uniquely identifying each ADF) and network topology data 735 of the network. The "5-tuple" may include an IP source address, an IP destination address, a source port number, a destination port number, and/or protocol information of the application data stream. The NMS 150 may receive backlog information from queues associated (e.g., 265 and other queues illustrated in FIG. 2) with network elements within the network path (904). The backlog information may be based on NE state data 250. NMS 150 may determine which queues can allocate resources to increase the performance values of an ADF while maintaining E2E compliance of other ADFs (906). NMS 150 may also determine which network elements can re-prioritize data being processed (e.g., in queues) to re-order the processing and/or transmission of the ADFs.

Figure 10:
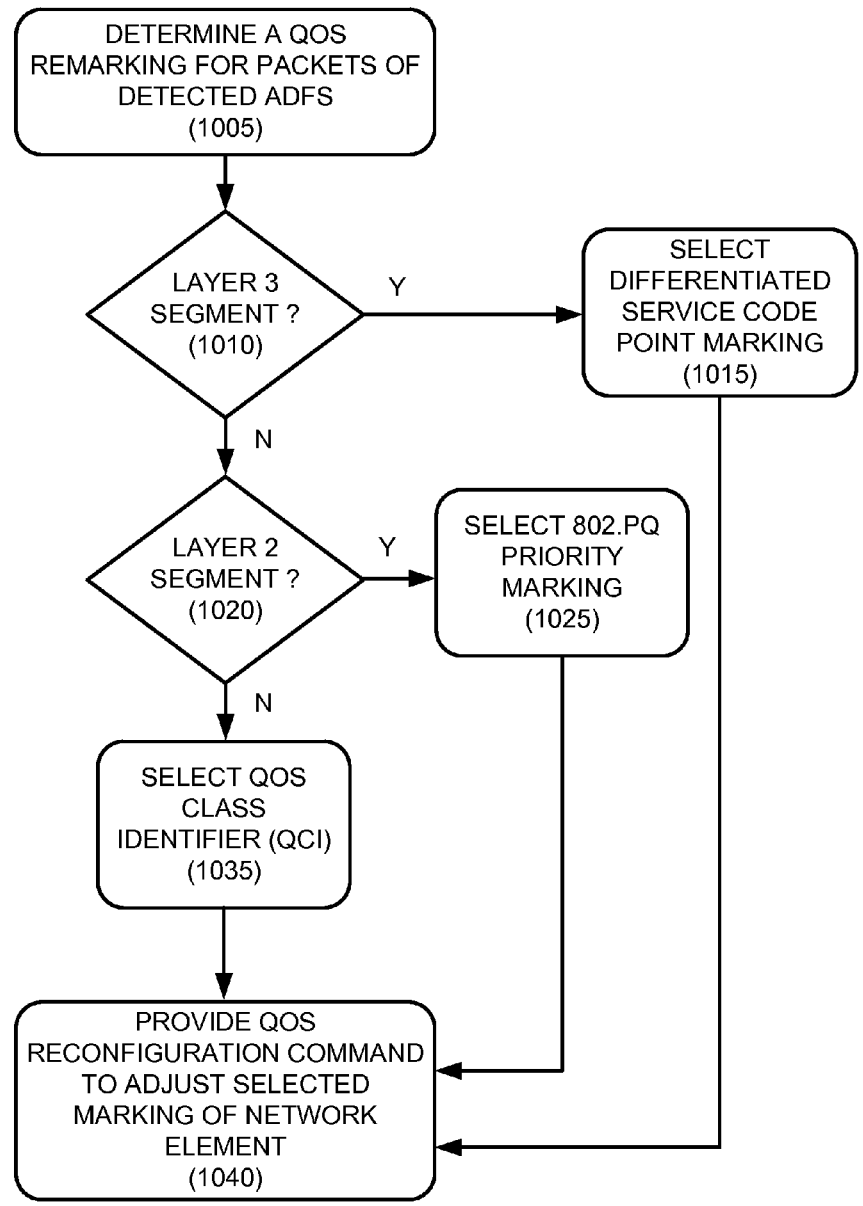
FIG. 10 is a flowchart showing an exemplary process for adjusting QoS parameters for different network segments.

FIG. 10 is a flowchart showing an exemplary process 860 for adjusting QoS parameters. Process 860 may be performed by NMS 150, which may determine a QoS re-marking for the packets of the detected ADFs to be adjusted at the network location(s) determined in Block 850 shown in FIG. 8 (1005). NMS 150 may determine the network location(s) is associated with a Layer 3 segment (1010). NMS 150 may select a Differentiated Service Code Point (DSCP) QoS parameter to be re-marked for adjustment (1015). If NMS 150 determines that the network location(s) is associated with a Layer 2 segment (1020), NMS 150 may select an 802.pq priority QoS parameter to be re-marked for adjustment (1025). If NMS 150 determines that the network location(s) is not associated with a Layer 3 or Layer 2 segment (e.g., is associated with a Radio Access Network (e.g., a eUTRAN)), then NMS 150 will select a QoS Class Identifier (QCI) to be re-marked for adjustment (1035).

Once NMS 150 determines what QoS parameter will be adjusted, NMS 150 may then determine the actual value for the QoS which is to be included in a QoS reconfiguration command 260. This command may be provided to a network element at the network location determined in Block 850. In one implementation, the values for the QoS parameters may be adjusted in small amounts, and NMS 150 may observe their effect (e.g., via traffic data) before making further adjustments. The adjustments may be based on heuristics, iterative techniques, and/or trial and error. In some embodiments, optimizations algorithms may be used to optimize the QoS parameter selection, the parameter values, and the determined network locations. If the initial adjustments do not result in the ADFs meeting their E2E requirements, the QoS parameters may be further adjusted and new QoS reconfiguration commands 260 may be sent to one or more various network elements.

The foregoing description of implementations provides illustration and description, but is not intended to be exhaustive or to limit the invention to the precise form disclosed. Modifications and variations are possible in light of the above teachings or may be acquired from practice of the invention. For example, while series of messages and/or blocks have been described with regard to FIGS. 8-10, the order of the messages and/or blocks may be modified in other embodiments. Further, non-dependent messaging and/or processing blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

In addition, implementations have described above with respect to identifying segments experiencing backpressure/congestion. In other implementations, methodology described herein may be used to identify idle/unused capacity in a network which can be offered to customers in measured allotments at varying rates. By leveraging traffic data 250, network topology data 735, and NE state data 250, the NMS 150 can provide significant visibility into the Quality of Experience for subscribers, and improve the efficiency for allotting networking resources among the subscribers.

The terms "comprises" and/or "comprising," as used herein specify the presence of stated features, integers, steps or components but does not preclude the presence or addition of one or more other features, integers, steps, components, or groups thereof. Further, the term "exemplary" (e.g., "exemplary embodiment," "exemplary configuration," etc.) means "as an example" and does not mean "preferred," "best," or likewise.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method for managing traffic across a network based on adjusting Quality of Service (QoS) parameters, comprising:
   receiving performance requirements for packets corresponding to different applications and QoS levels within segments across the network;
   measuring performance values along segments transferring application data flows across the network;
   identifying the application data flows, along with their associated network locations, having performance values which fail to meet the performance requirements for at least one segment of the network;
   detecting an application data flow which fails to meet end-to-end (E2E) performance requirements based on the identified application data flows;
   determining at least one network location to adjust the QoS parameters of the detected application data flow; and
   adjusting the QoS parameters of the detected application data flow at the at least one network location to bring the detected application data flow into compliance with its E2E performance requirements, while maintaining E2E performance compliance of other application data flows.

2. The method of claim 1, wherein the performance requirements are provided by a QoS specification that further comprises minimum performance requirements for at least one of the QoS levels or a plurality of application types.

3. The method of claim 2, wherein the QoS specification comprises at least one of packet delay budgets or packet error loss rates.

4. The method of claim 1, wherein the measuring the performance values along segments transferring the application data flows further comprises:
   measuring latency of packets in application data flows across at least one of a segment or a network element.

5. The method of claim 1, wherein the measuring performance values along segments transferring the application data flows further comprises:
   collecting the performance values based on at least one of a per application basis, per subscriber basis, per segment basis, or per QoS basis; and
   calculating statistics of the collected performance values.

6. The method of claim 1, wherein the identifying the application data flows further comprises:
   comparing the received performance requirements with the measured performance values for each segment traversed by the application data flows based on at least one of a per application basis, per subscriber basis, or per QoS basis.

7. The method of claim 6, wherein the measured performance values comprise at least one of time delay or packet loss for packets within the application data flows.

8. The method of claim 1, wherein the determining the at least one network location to adjust the QoS parameters further comprises:
   determining a network path traversed by the detected application data flow;
   receiving backlog information from queues associated with network elements within the network path; and
   determining which queues can allocate resources to increase the performance values of the detected application data flow while maintaining the E2E performance compliance of the other application data flows.

9. The method of claim 8, wherein the determining the network path traversed by the detected application data flow comprises:
   determining a unique identifier for the detected application data flow based on at least one of an internet protocol (IP) source address, an IP destination address, a source port number, a destination port number, or protocol information of the application data flow; and
   correlating network topology information with the unique identifier of the detected application data flow.

10. The method of claim 1, wherein the adjusting the QoS parameters further comprises:
    determining a QoS re-marking for packets of the detected application data flow to be adjusted; and
    providing a QoS reconfiguration command to a network element corresponding to the determined at least one network location to re-mark the packets of the detected application data flow.

11. The method of claim 1, wherein the adjusting the QoS parameters comprises:
    adjusting application data flows, which traverse wireless channels having poor signal conditions, to maintain compliance with the E2E performance requirements of the application data flows,
    wherein when the detected application data flow traverses a layer 3 segment on the network, a QoS reconfiguration command changes Differentiated Services Code Point (DSCP) markings on packets of the application data flow,
    wherein when the detected application data flow traverses a layer 2 segment on the network, the QoS reconfiguration command changes 802.pq priority markings on the packets of the application data flow, and
    wherein when the detected application data flow traverses a radio access network (RAN) on the network, the QoS reconfiguration command changes QoS Class Identifier (QCI) markings associated with the packets of the application data flow.

12. A network device, comprising:
    an interface that communicates with a network;
    a memory configured to store instructions; and
    a processor, coupled to the interface and the memory, wherein the processor is configured to execute the instructions stored in the memory to:
      receive performance requirements for packets corresponding to different applications and Quality of Service (QoS) levels within segments across the network,
      measure performance values along segments transferring application data flows across the network,
      identify the application data flows, along with their associated network locations, having performance values which fail to meet the performance requirements for at least one of the segments,
      detect an application data flow which fails to meet end-to-end (E2E) performance requirements based on the identified application data flows,
      determine at least one network location to adjust QoS parameters of the detected application data flow, and
      adjust the QoS parameters of the detected application data flow at the at least one network location to bring the detected application data flow into compliance with its E2E performance requirements, while maintaining E2E performance compliance of other application data flows.

13. The network device of claim 12, wherein the performance requirements are provided by a QoS specification that further comprises minimum performance requirements for at least one of the QoS levels or a plurality of application types.

14. The network device of claim 12, wherein the instructions to measure the performance values along segments transferring the application data flows comprise instructions further causing the processor to:
measure latency of packets in application data flows across at least one of a segment or a network element.

15. The network device of claim 12, wherein the instructions to measure the performance values along segments transferring the application data flows comprise instructions further causing the processor to:
collect the performance values based on at least one of a per application basis, per subscriber basis, per segment basis, or per QoS basis; and
calculate statistics of the collected performance values.

16. The network device of claim 12, wherein the instructions to determine the at least one network location to adjust the QoS parameters comprise instructions further causing the processor to:
determine a network path traversed by the detected application data flow;
receive backlog information from queues associated with network elements within the network path; and
determine which queues can allocate resources to increase the performance values of the detected application data flow while maintaining the E2E performance compliance of the other application data flows.

17. The network device of claim 16, wherein the instructions to determine the network path for the detected application data flow comprise instructions further causing the processor to:
determine a unique identifier for the detected application data flow based on at least one of an internet protocol (IP) source address, an IP destination address, a source port number, a destination port number, or protocol information of the application data flow; and
correlate network topology information with the unique identifier of the application data flow.

18. The network device of claim 12, wherein the instructions to adjust the QoS parameters comprises instructions further causing the processor to:
determine a QoS re-marking for packets of the detected application flow to be adjusted; and
provide a QoS reconfiguration command to a network element corresponding to the determined at least one network location to re-mark the packets of the detected application flow.

19. The network device of claim 12, wherein the instructions to adjust the QoS parameters further comprise instructions which cause the processor to adjust application data flows, which traverse wireless channels having poor signal conditions, to maintain compliance with the E2E performance requirements of the application data flows,
wherein when the detected application data flow traverses a layer 3 segment on the network, a QoS reconfiguration command changes Differentiated Services Code Point (DSCP) markings on packets of the application data flow,
wherein when the detected application data flow traverses a layer 2 segment on the network, the QoS reconfiguration command changes 802.pq priority markings on the packets of the application data flow, and
wherein when the detected application data flow traverses a radio access network (RAN) on the network, the QoS reconfiguration command changes QoS Class Identifier (QCI) markings associated with packets of the application data flow.

20. A non-transitory computer-readable medium comprising instructions, which, when executed by a processor, cause the processor to:
receive performance requirements for packets corresponding to different applications and Quality of Service (QoS) levels within segments across a network;
measure performance values along segments transferring application data flows across the network;
identify the application data flows, along with their associated network locations, having performance values which fail to meet the performance requirements for at least one of the segments;
detect an application data flow which fails to meet end-to-end (E2E) performance requirements based on the identified application data flows;
determine at least one network location to adjust QoS parameters of the detected application data flow; and
adjust the QoS parameters of the detected application data flow at the at least one network location to bring the detected application data flow into compliance with its E2E performance requirements, while maintaining E2E performance compliance of other application data flows.

21. The non-transitory computer-readable medium of claim 20, wherein the instructions to measure the performance values along segments transferring the application data flows comprise instructions further causing the processor to:
collect the performance values based on at least one of a per application basis, per subscriber basis, per segment basis, or per QoS basis; and
calculate statistics of the collected performance values.

22. The non-transitory computer-readable medium of claim 20, wherein the instructions to determine the at least one network location to adjust QoS parameters comprise instructions further causing the processor to:
determine a network path traversed by the detected application data flow;
receive backlog information from queues associated with network elements within the network path; and
determine which queues can allocate resources to increase the performance values of the detected application data flow while maintaining the E2E performance compliance of the other application data flows.

23. The non-transitory computer-readable medium of claim 22, wherein the instructions to determine the network path for the detected application data flow comprise instructions further causing the processor to:
determine a unique identifier for the detected application data flow based on at least one of an internet protocol (IP) source address, an IP destination address, a source port number, a destination port number, or protocol information of the application data flow; and
correlate network topology information with the unique identifier of the application data flow.

24. The non-transitory computer-readable medium of claim 20, wherein the instructions to adjust the QoS parameters comprise instructions further causing the processor to:
determine a QoS re-marking for packets of the detected application flow to be adjusted; and
provide a QoS reconfiguration command to a network element corresponding to the determined at least one network location to re-mark the packets of the detected application flow.

25. The non-transitory computer-readable medium of claim 20, wherein the instructions to adjust the QoS parameters further comprise instructions which cause the processor to adjust application data flows, which traverse wireless channels having poor signal conditions, to maintain compliance with the E2E performance requirements of the application data flows, wherein when the detected application data flow traverses a layer 3 segment on the network, a QoS reconfiguration command changes Differentiated Services Code Point (DSCP) markings on packets of the application data flow, wherein when the detected application data flow traverses a layer 2 segment on the network, the QoS reconfiguration command changes 802.pq priority markings on the packets of the application data flow, and wherein when the detected application data flow traverses a radio access network (RAN) on the network, the QoS reconfiguration command changes QoS Class Identifier (QCI) markings associated with the packets of the application data flow.

\* \* \* \* \*